Patented July 6, 1926.

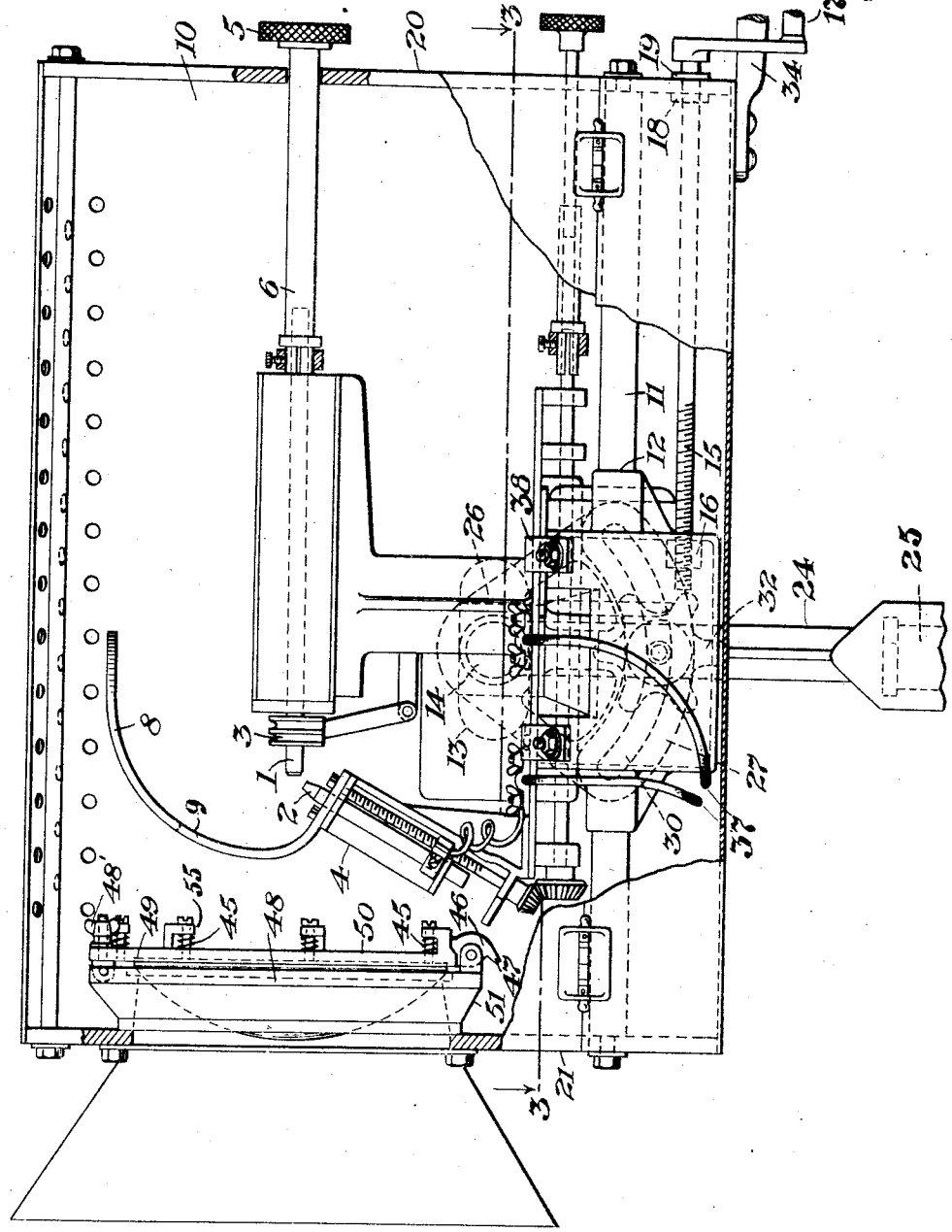

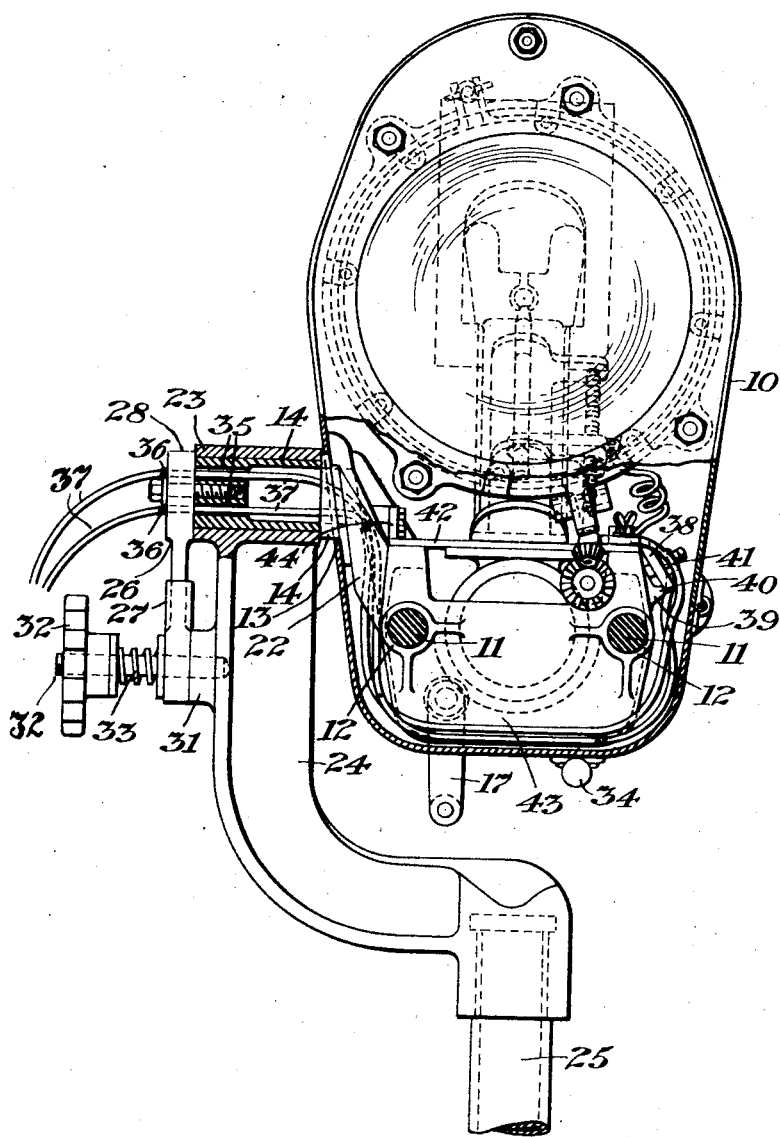

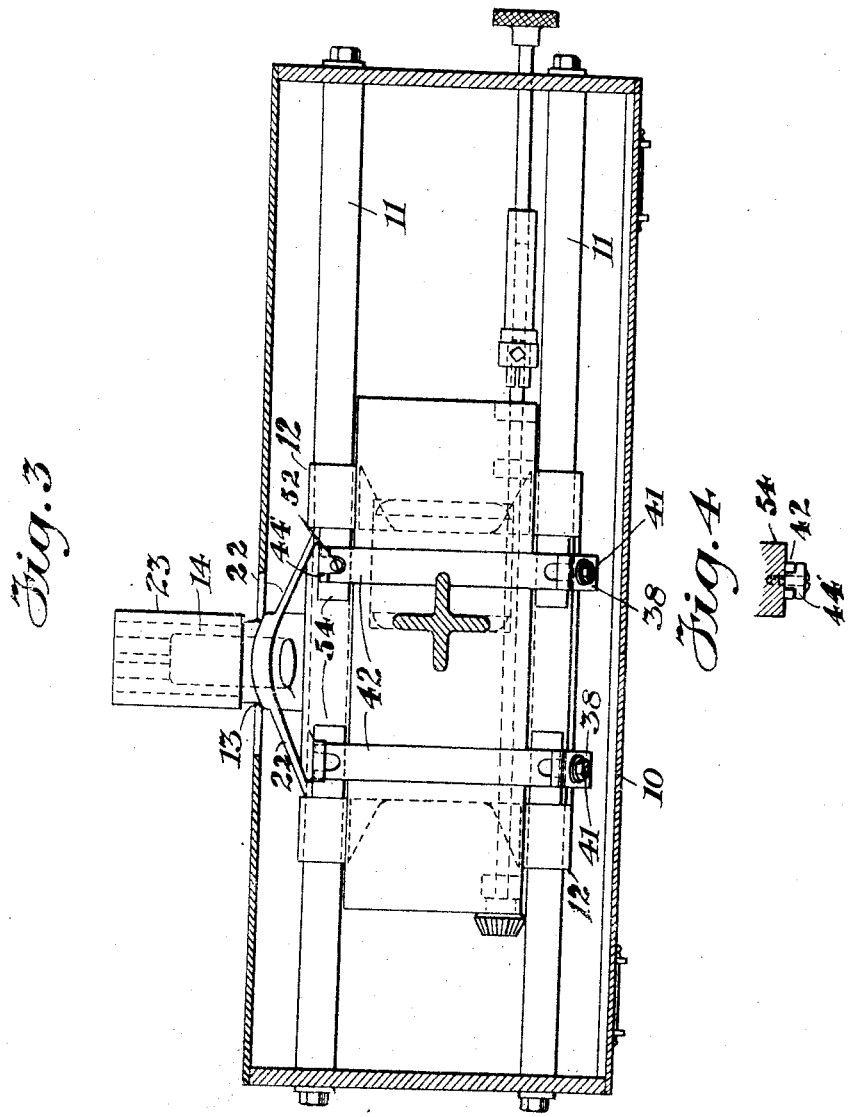

1,591,128

UNITED STATES PATENT OFFICE.

PERRY L. HAYNES, OF HOBOKEN, NEW JERSEY, ASSIGNOR TO COOPER HEWITT ELECTRIC COMPANY, OF HOBOKEN, NEW JERSEY, A CORPORATION OF NEW JERSEY.

ARC-LIGHT PROJECTOR.

Application filed May 4, 1923. Serial No. 636,775.

My present invention relates to electric arc light projectors and especially to projectors suitable for moving picture studio work and for similar uses. It is desired of a projector for such uses that it be light and portable, that the mechanism be nicely balanced on its standard so that the direction of the light can be easily and quickly adjusted in a vertical plane as well as in the horizontal plane, that the focus of the light can be easily and quickly adjusted, and that the lamp mechanism can be quickly taken out of its case and as quickly returned.

In my device I have obtained lightness, balance, and ease of adjustment of focus by mounting the mechanism of the lamp itself directly to the standard and making the casing which holds the focusing lens adjustably movable along the axis of the projected beam of light. And to obtain this balance and ease of adjustment to a high degree I pivotally connect the lamp mechanism to a substantially L shaped bracket at a point substantially opposite its center of gravity in a horizontal line. Another pivotal connection is made in the bracket at a point below the lamp directly under its center of gravity in a vertical line. The bracket connects the vertical plane pivot to the horizontal pivot and the latter is connected to an upright standard mounted on rollers. By mounting resistances, control mechanism, etc., on these rollers and below the lamp I lower the center of gravity of the whole structure and so stabilize it. Pivotal connection in a vertical line can be made above the lamp instead of beneath it when it is desired, for instance, to suspend the lamp instead of supporting it from below. Heretofore projector outfits have been of such design as to lack ease of adjustment and focus. By making the casing adjustable instead of the lamp mechanism I have made a lamp that is very flexible of control and focus. The positioning of the pivotal connections in my lamp support further contributes to the flexibility and ease of handling the lamp. To focus the beam of light or obtain a spread thereof for a flood-light I move the lens with respect to the arc instead of moving the arc. The lens being mounted in the front of the casing I make the casing movable over the arc mechanism for the purpose of adjusting the light beam.

In studio work when the lamp is in use any changes or adjustments made in the lamp are required to be made quickly. By providing quickly detachable means for connecting the lamp itself to its adjusting mechanism and to its electric feed mains the lamp can be very quickly withdrawn from the casing so that all its parts can be got at for adjustment, change or repair. In the embodiment of my invention shown in the drawing and described herein I have disconnected the lamp and withdrawn it from the casing in less than one minute and returned it as quickly. The details of this construction are shown in the drawings and described herein.

In the drawings Fig. 1 is a side elevation with the casing partially broken away to show the lamp mounted in the interior of the housing. Fig. 2 is a front end elevation with the housing partially broken away to show the interior construction and Fig. 3 is a sectional view looking downward at line 3—3 in Fig. 1 and shows the details of the detachable means for securing the lamp to its regulating mechanism. Fig. 4 is a detail view of clamping stud 44'.

In the drawings 10 is a casing mounted by means of rods 11 and the ways 12 to the lamp mechanism. Movement of the casing on the support is allowed by the longitudinal slot, 13, through which passes the support stud, 14, and is produced by means of screw, 15, operating in threaded boss, 16, and manually turned by means of handle, 17. The washers, 18 and 19, fixed to the screw, 15, bear one on each side of the casing head 20 and on rotation of the screw and upon its movement in the threaded boss 16 the casing is moved with it, the rods, 11, sliding in the ways, 12. The rods, 11, are suitably secured at their ends to the heads, 20 and 21, respectively. The lamp mechanism is mounted on the standard, 25, by means of the stud, 14, which rides in the bearing, 23, formed at the head of the bracket, 24, which latter is mounted on the standard, 25. The brackets 22 and 22' connect the latter to the stud, 14. The quadrant, 26, is fixed to the end of the stud 14 at its center 28, the latter also serves as an end bearing for the stud against the end of the bearing 23. The arc, 27, of the quadrant moves over the face of the boss, 31, formed on the bracket 24, and the hand nut, 32, adjustable on the stud, 32', extending through the arc slot, 30, is used to secure the arc, 27, against the boss, 31, and thereby hold the lamp in the desired position. The spring, 33, between the hand nut, 32, and the quadrant arc, 27, when a slight tension is produced therein serves to allow a smooth and regulated movement of the lamp mechanism when the latter is moved on the bearing, 23. When a desired position of the lamp is secured the arc quadrant is clamped tightly between the hand nut and the boss, 31. The handle, 34, on the casing is grasped by the operator when he desires to move the casing and the lamp about either of its axes.

Through the stud, 14, extend the two holes, 35, in which are the insulating bushings, 36, and through which pass the main supply cables, 37, into the lamp casing. This allows full freedom of movement of the lamp mechanism with but slight movement of the cables leading thereto.

The lamp is held on the case casting, 43, by means of a novel clamping arrangement which permits a quick withdrawal or return of the lamp from its base. Two bars, 42, fixed transversely of the bottom of the lamp rest upon the top of the casting, 43, and the forward one of these has one end resting against a vertical surface on the bracket, 22, and under a lug, 44, formed on said bracket, 22. As shown in Fig. 3 the shoulder lug 44' and tongue, 52, extending inwardly are formed on pad, 54, of the base casting, 43. The end of rear bar, 42, which rests on pad, 54, fits with its slot, 53, under the shoulders of 44' and about tongue, 52, with these serves to hold the mechanism when clamped down from longitudinal and vertical movement. Fig. 4 shows the end of 42 on pad 54 and under the shoulders of 44'. Two angle clamps are used to press the bars, 42, downward against 43 and transversely against the bracket, 32, and the tongue, 52. As shown in Fig. 2 the humps, 40, on lugs, 39, serve to give sufficient leverage to the clamps, 38 for the bolts, 41, to hold the lamp in a solid and fixed position.

The lens, 48, is removably fixed in the front end of the casing by means of the frame rings, 50 and 51, hinged together at 46. The tail, 47, on 46 limits the motion of ring 50 when that member is moved on its hinge. Clamp screw and nut, 48', serve to hold the ring, 50, in the closed position. The springs, 45, acting between the fingers, 55, on rings, 50, and lens, 48, relieve mechanical strains in the glass due to supporting means.

I claim as my invention:

1. In a studio projector lamp in combination, a lamp, a casing therefor, a base for said lamp and quickly detachable clamping means therebetween, ways fixed to said base, rods slidably mounted in said ways and fixed to said casing, a support for said base, a pivotal connection between said support and base, a slot in said casing through which extends part of said pivotal connection, said slot allowing movement of the casing about said lamp, and feed mains for said lamp.

2. In an arc lamp mechanism, in combination with a lamp mechanism having a casing adjustable longitudinally with respect thereto and a lens in the forward end of said casing, a substantially L shaped bracket for said lamp mechanism, a pivotal connection between said mechanism and said bracket at a point substantially opposite the center of gravity of the mechanism in a horizontal line, an upright standard and a pivotal connection between said bracket and said standard at a point substantially opposite the center of gravity of the lamp mechanism in a vertical line.

3. In an arc light projector, in combination with a lamp mechanism having a casing adjustable longitudinally with respect thereto and a lens in the forward end of said casing, means for adjusting said casing with respect to said lamp, a substantially L shaped bracket for said lamp mechanism, a pivotal connection between said mechanism and said bracket at a point substantially opposite the center of gravity of the lamp in a horizontal line, said pivotal connection comprising a stud fixed to the lamp and a bearing on said bracket, openings extending longitudinally of said stud through which pass leads to said lamp, a slot in said casing through which said stud extends, a quadrant connected near its center to said stud, the arc of said quadrant slidably engaging a boss on said L shaped bracket, a slot in said arc, a stud extending through said arc slot and threaded into said boss, a hand nut on said stud, a spring between said hand nut and said arc, a support for said bracket and a pivotal connection therebetween at a point substantially opposite the center of gravity of the lamp in a vertical line.

Signed at Hoboken in the county of Hudson and State of New Jersey this 20th day of April A. D. 1923.

PERRY L. HAYNES.